United States Patent [19]
Check, III

[11] Patent Number: 5,728,251
[45] Date of Patent: Mar. 17, 1998

[54] LIGHT MODULATING FILM OF IMPROVED UV STABILITY FOR A LIGHT VALVE

[76] Inventor: Joseph A. Check, III, 46 Bardolier La., West Bayshore, N.Y. 11706

[21] Appl. No.: 534,516

[22] Filed: Sep. 27, 1995

[51] Int. Cl.⁶ .................................................. C09J 5/02
[52] U.S. Cl. .......................... 156/307.5; 156/87; 156/182; 359/253
[58] Field of Search ........................... 156/307.5, 182, 156/87; 359/253

[56] References Cited

U.S. PATENT DOCUMENTS 4,919,521  4/1990  Tada et al. .

FOREIGN PATENT DOCUMENTS

| 551136 | 4/1993 | European Pat. Off. . | |
|---|---|---|---|
| 551138 | 4/1993 | European Pat. Off. . | |
| 4-40425 | 2/1992 | Japan | 156/307.5 |
| 9309460 | 12/1993 | WIPO . | |
| 9411772 | 2/1994 | WIPO . | |

*Primary Examiner*—John J. Gallagher
*Attorney, Agent, or Firm*—Graham & James LLP

[57] ABSTRACT

An improved process for making a light valve includes cross-linking and curing an SPD light valve film carried by a substrate while the film is uncovered and then laminating a second substrate to the uncovered surface of the cured SPD light valve film.

20 Claims, 2 Drawing Sheets

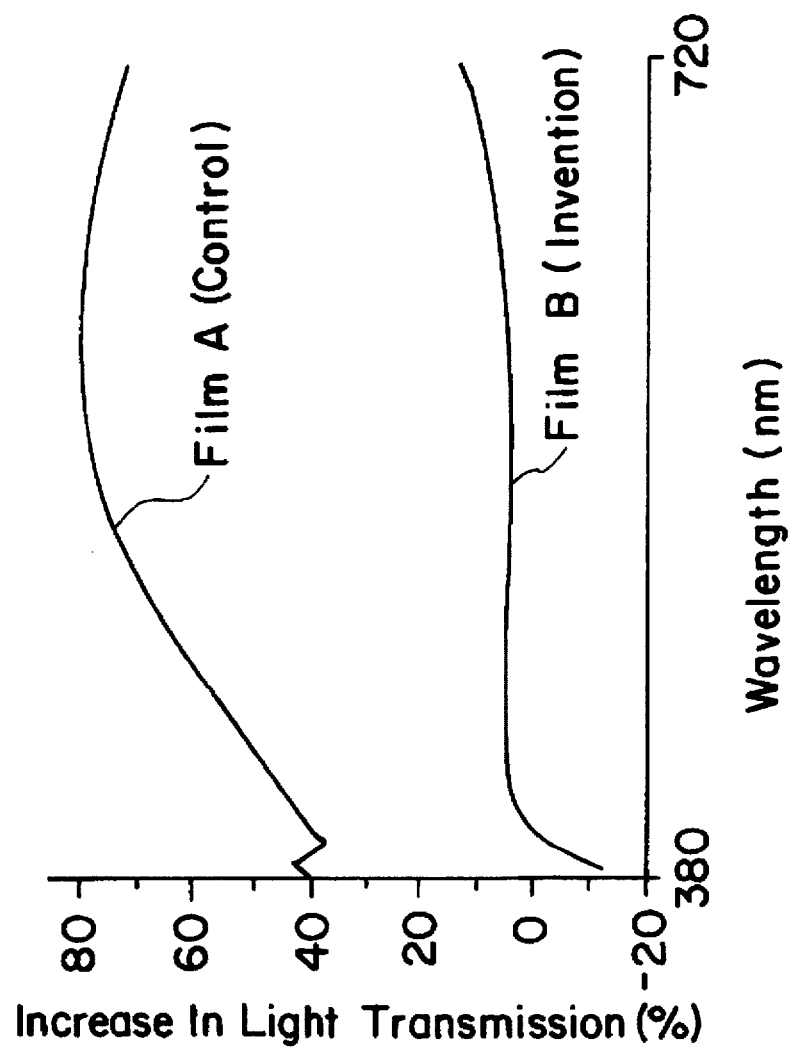

LIGHT MODULATING FILM OF IMPROVED UV STABILITY FOR A LIGHT VALVE

FIELD OF INVENTION

The present invention relates to light valves and more particularly to improvements relating to incorporating within a plastic film a light valve suspension used to control light transmission in a light valve.

BACKGROUND

Light valves have been used for over sixty years for modulating of light. A light valve may be described as a cell formed of two walls that are spaced apart by a small distance, at least one wall being transparent, the walls having electrodes thereon usually in the form of transparent conductive coatings. The cell contains a "light valve suspension" of small particles suspended in a liquid suspending medium. Light valves based upon the use of suspended particles are referred to as SPD light valves.

In the absence of an applied electrical field (the "OFF" state), the particles in the liquid suspension exhibit random Brownian movement, and hence a beam of light passing into the cell is reflected, transmitted or absorbed, depending upon the nature and concentration of the particles and the energy content of the light. When an electric field is applied through the light valve suspension in the light valve (the "ON" state), the particles become aligned and for many suspensions most of the light can pass through the cell. Light valves have been proposed for many purposes including, e.g., alphanumeric displays, television displays, windows, mirrors, eyeglasses and the like to control the amount of light passing therethrough.

International Application PCT/US92/09034, which was published as International Publication No. WO 93/09460, and International Application PCT/US93/10495, which was published as WO94/11772, are incorporated herein by reference thereto. Those applications describe a film suitable for use in an SPD light valve, comprising a cross-linked polymer matrix having droplets of a light valve suspension distributed in the cross-linked polymer matrix, the light valve suspension comprising particles suspended in a liquid suspending medium. The particles exhibit random Brownian movement in the absence of an electric field applied to the light valve suspension and become aligned in the presence of an electric field applied to the light valve suspension.

Also incorporated herein by reference thereto are my copending U.S. application Ser. Nos. 07/972,826 and 07/972,830, both filed Nov. 6, 1992, now U.S. Pat. Nos. 5,463,491 and 5,463,492. These United States Applications likewise describe SPD light valves using such light-modulating films.

According to the above International Applications, the SPD light valve film is formed by providing an emulsion of the liquid light valve suspension in a liquid cross-linkable polymer. A cross-linking agent is also provided in the emulsion. The film-forming emulsion is cast on a substrate and allowed to cure by the reaction between the cross-linking agent and the cross-linkable polymer.

The Examples of the above-identified International Applications describe two methods for forming an SPD light valve film. In one method, the film-forming emulsion is cast on a substrate, cured and swollen with a liquid, and then the swollen cured film is sandwiched between electrode-carrying substrates to form an SPD light valve film. In the second method, the film-forming emulsion is cast on a first electrode-carrying substrate, the cast liquid is covered with a second electrode-carrying substrate and the resulting sandwich is cured at 85° C. See Example 7 of WO93/09460 and Example 27 of WO94/11772.

The first method of the above-identified International Applications gives rise to problems associated with handling a swollen cured film, such as tearing of the film. Moreover, the cured films swollen with the liquids described in the above identified International Application become appreciably larger in the length and width dimensions and hence appreciably thinner as compared to the unswollen film. Thinner SPD light valve films have fewer particles per unit of area and hence may transmit too much light in the OFF state to provide sufficient contrast to the ON state. Moreover, the swelling liquids disclosed in the above-identified International Application are volatile and the light valve cell containing the swollen film must be sealed around the edges to prevent loss of the swelling liquid with time. This adds to the costs in producing SPD light valves.

The second method described in the above International Application avoids these processing issues because the cured film is not swollen. Rather, the film-forming liquid emulsion is sandwiched between the substrates and heated to 85° C. and cured. Surprisingly, SPD light valve films obtained in this manner were found to have unsatisfactory UV stability and hence required the addition of UV absorbers. However, the use of UV absorbers, while providing the desired UV stability to the SPD light valve film, nevertheless increased the light scatter or "haze" of the film.

It would be desirable to provide a method of manufacturing an SPD light valve film, in which the cured film is not swollen with a liquid and has acceptable UV stability without the use of a UV absorber in and/or covering the film.

BRIEF DESCRIPTION OF THE DRAWINGS

The present invention is illustrated in terms of a preferred embodiment by reference to the accompanying drawings in which:

FIG. 2 shows the percentage increase in light transmission in the OFF state of SPD light valves according to the prior art and to the present invention, respectively, after extended exposure to UV radiation.

SUMMARY OF THE INVENTION

Figure 1A:
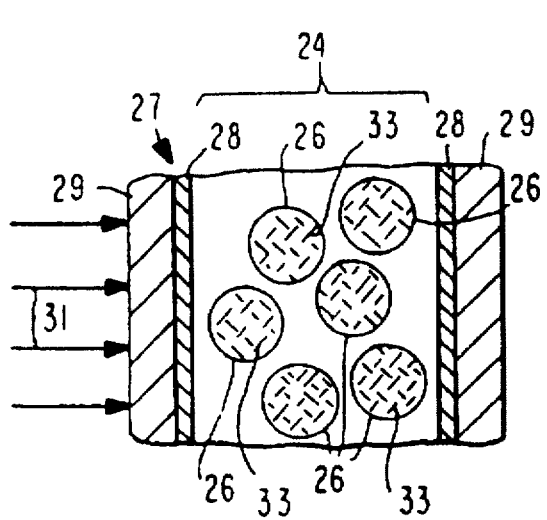
FIGS. 1A and 1B illustrate the closed (OFF) and open (ON) states of an embodiment of an SPD light valve film of the present invention.

The present invention now provides a method of preparing an SPD light valve, comprising:

(a) casting on a first substrate a layer of a film-forming liquid or semi-solid emulsion comprising a cross-linkable polymer, a cross-linking agent, a catalyst and a liquid light valve suspension, the liquid light valve suspension comprising particles suspended in a liquid suspending medium, the layer having a first surface in contact with the first substrate and an uncovered, opposed second surface;

(b) cross-linking and curing the cross-linkable polymer in the layer by reaction with the cross-linking agent in the presence of the catalyst while the second surface of the layer remains uncovered to form a cured SPD light valve film comprising a cross-linked polymer matrix having droplets of the liquid light valve suspension distributed therethrough, the cured SPD film having one surface in contact with said first substrate and an uncovered, opposed second surface, the cured SPD film being unswollen by any swelling liquid;

(c) covering the uncovered surface of the cured and unswollen SPD light valve film with a second substrate;

(d) laminating the substrates to the SPD light valve film; and (e) providing each of the substrates with an electrode before or after the lamination step.

While not being bound by any theory, it is presently believed that when a layer of the film-forming liquid or semi-solid emulsion is cured while sandwiched between two substrates, the cured SPD light valve film will contain materials derived from and/or giving rise to the cross-linking reaction that will be harmful to the UV-stability of the film if allowed to remain in the cured film, such as any cross-linking catalyst and/or any unreacted cross-linking agent, and/or the by-products of the cross-linking reaction. Curing the cross-linkable polymer while the layer of film-forming emulsion is uncovered enables volatile materials to escape from the cured film, and hence they cannot adversely affect the SPD light valve made from the cured film.

A laminate of a cured and unswollen SPD light valve film between opposed substrates prepared according to the present invention will have significantly improved UV stability as compared to a laminate prepared by curing the SPD light valve film while the film-forming liquid emulsion is sandwiched between two substrates.

This can be seen from FIG. 2, which shows the percentage increase in light transmission through SPD light valves A and B in the OFF state after prolonged exposure to ultra-violet radiation, as compared to the light transmission through these light valves before exposure to ultra-violet radiation. SPD light valves A and B were formed from the same film-forming liquid emulsion, except that SPD light valve A used an SPD light valve film that was cured at 85° C. for one hour while sandwiched between two substrates, whereas the SPD film for light valve B was cured by casting a layer of the film-forming liquid emulsion on a substrate and allowing the curing reaction to proceed while the layer remained uncovered for four days at room temperature, and thereafter covering the cured, unswollen SPD light valve film with a second substrate to form a laminate. As seen from FIG. 2, SPD light valve B prepared according to the invention showed little change in light transmission in the OFF state across the entire spectrum tested after long exposure to ultraviolet radiation, whereas SPD light valve A showed a substantial increase in light transmission in the OFF state after long exposure to ultraviolet radiation due to the degradation of the light valve suspension of the SPD light valve film by ultraviolet radiation. The experimental data supporting FIG. 2 are reported in Examples 1(a), 1(b), and 2 below.

MANUFACTURE OF THE SPD LIGHT VALVE

In accordance with the present invention, a liquid or semi-solid emulsion comprising a cross-linkable polymer or oligomer, a cross-linking agent and, and optionally, a cross-linking catalyst is cast on a substrate. The substrate may be any light-transmitting substrate suitable for use in SPD light valves, such as glass or plastic, such as polycarbonates or polyesters. The substrate may carry a suitable electrode, as described hereinafter, before the liquid emulsion is cast on the substrate or the electrode may be provided after the SPD light valve is cured. The electrode may be in contact with the cured SPD film or on the surface of the substrate not in contact with the cured SPD film.

The uncovered layer of liquid or semi-solid emulsion may be cured at room temperature (e.g. about 18°–22° C.) while exposed to the atmosphere for up to several days. If desired, the uncovered layer of emulsion may also be cured at room temperature under vacuum or in a laminar flow hood, whereby the volatilization of volatile materials may be accelerated. Further, the uncovered layer of emulsion may be cured at elevated temperature, such as about 60°–95° C.; preferably about 85° C., although this may discolor certain cured SPD films.

After the curing of the film is completed, the uncovered surface of the cured SPD light valve film is covered with a second substrate to form a laminate. Preferably, the second substrate carries an electrode previously applied to the substrate. The cured and unswollen SPD light valve film is sufficiently adhesive to be laminated to the opposed substrates without an adhesive. If necessary or desired, a known, optically-transparent adhesive can be used to laminate the SPD light valve film to the substrates. Any liquid light valve suspension may be used in the present invention. Similarly, any of the liquid cross-linkable polymers or oligomers that will form an emulsion with the liquid or semi-solid light valve suspension may also be used. Suitable liquid or semi-solid emulsions comprising a liquid light valve suspension, and cross-linkable polymer or oligomer are disclosed in the above International Applications. Likewise, the use of emulsifiers, cross-linking agents and catalysts suitable for forming SPD films are also described in the above International Applications.

The materials used to form the SPD films and SPD light valves according to the present invention are described in more detail below.

The Liquid Light Valve Suspension

The liquid light valve suspension distributed in the cross-linked polymer matrix of the film of the present invention may be any liquid light valve suspension known in the art and may be formulated according to known techniques. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed.

As is known, inorganic and organic particles may be used in a light valve suspension, such as mica, metals, graphite, metal halides, polyhalides (sometimes referred to in the prior art as perhalides) of alkaloid acid salts and the like. The particles in the liquid suspension may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969.) If a polyhalide of an alkaloid acid salt is used, the alkaloid moiety may be a quinine alkaloid, as defined in Hackh's Chemical Dictionary, supra. U.S. Pat. Nos. 2,178,996 and 2,289,712 refer in detail to the use of polyhalides of quinine alkaloid acid salts. The particles may be light-absorbing or light-reflecting.

Also, the particles may be particles of a hydrogenated polyhalide of a quinine alkaloid acid salt, such as dihydrocinchonidine sulfate polyiodide, as described in U.S. Pat. No. 4,131,334, or a light-polarizing metal halide or polyhalide, such as cupric bromide or purpureocobaltchloride sulfate polyiodide, as, e.g., in U.S. Pat. No. 1,956,867. Preferably, the particles are light-polarizing polyhalide particles such as those described in U.S. Pat. Nos. 4,877,313 and 5,002,701 which are more environmentally stable than prior art polyhalides.

In theory; any type of particle capable of reflecting, absorbing and/or transmitting desired wavelengths of visible light can be used in the liquid light valve suspension. For the purposes of the present invention, however, particles that reflect a substantial amount of visible light can cause objectionable light scatter and are therefore not usually desirable.

The shape of the particles used in the light valve suspension should preferably be "anisometric", i.e. the shape or structure of the particle is such that in one orientation the particle intercepts more light than in another orientation. Particles which are needle-shaped, rod-shaped, lath-shaped, or in the form of thin flakes, are suitable. Light-polarizing crystals are especially useful because they produce a pleasing visual appearance, but any type of light-absorbing particle, preferably exhibiting very little light scatter, can be employed.

The particles are preferably of colloidal size, that is the particles will have a large dimension averaging about 1 micron or less. It is preferred that most particles have large dimensions less than one-half of the wavelength of blue light, i.e. 2000 Angstroms or less to keep light scatter extremely low.

The particles are also preferably light-absorbing, that is, the particles absorb a significant part, preferably most, of the light impinging on it and scatter relatively little of the light that impinges on them. Light-absorbing particles comprise many types of material including colored orientable pigments and dyes, e.g., garnet red, conductive black or grey material such as graphite or carbon black, dichroic dyes such as are widely used in guest-host liquid crystal devices, light-polarizing materials, e.g., cupric bromide, and polyhalides, and especially polyiodides, e.g., those described in conjunction with prior art light valve devices.

The term "polyiodide" as used herein is used in the conventional sense and also in the same sense as the term "periodide" is used in numerous prior art light valve patents, e.g., see column 1 of U.S. Pat. No. 1,951,664 (Land) entitled "Colloidal Suspensions and the Process of Making Same", to indicate a material which is a reaction product of a precursor compound, which may be a sulfate (or certain other salts as described in U.S. Pat. No. 4,270,841) of heterocyclic nitrogenous bases with iodine and an iodide. Such reaction products are often called polyiodide compounds. This type of particle is discussed in detail in "The Optical Properties and Structure of Polyiodides" by D. A. Godina and G. P. Faerman published in The Journal of General Chemistry, U.S.S.R. Vol. 20, pp. 1005–1016 (1950). Herapathite, for example, is quinine bisulfate polyiodide, and its formula is given under the heading "quinine iodosulfate" as $4C_{20}H_{24}N_2O_2 \cdot 3H_2SO_4 \cdot 2HI \cdot I_4 \cdot 6H_2O$ in The Merck Index, 10th. Ed. (Merck & Co., Inc., Rahway, N.J.). In more modern, preferred types of polyiodides, the precursor compound need not be a salt, e.g., see U.S. Pat. Nos. 4,877,313 and 5,002,701. In these polyiodide compounds the iodine is thought to form chains and the compounds are strong light polarizers. The term "polyhalide" is used herein to mean a compound such as a polyiodide, but wherein at least some of the iodine in the iodide is replaced by another halogen element.

The liquid light valve suspension distributed in the film of the present invention may include any of the liquid suspending media previously proposed for use in light valves for suspending the particles. In general, the liquid suspending medium may comprise one or more electrically resistive, chemically inert liquids that will both suspend the particles and dissolve any polymeric stabilizer used to reduce the tendency of the particles to agglomerate and thus keep the particles in suspension. Liquid suspending media that are known in the art are useful herein, such as the liquid suspending media disclosed in U.S. Pat. No. 4,247,175. In general one or both of the liquid suspending media or the polymeric stabilizer dissolved therein is chosen so as to maintain the suspended particles in gravitational equilibrium.

A light valve suspension useful in the present invention is described in U.S. Pat. No. 4,407,565 and is based upon the use as the liquid suspending medium of an electrically resistive, chemically inert, low molecular weight liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine. Preferably, the liquid suspending medium also comprises a miscible electrically resistive organic liquid such as, for example, trialkyl trimellitate, etc. to provide gravitational equilibrium to the suspended particles and to assist in dispersing the particles in the liquid suspending medium. Other materials useful as the miscible electrically resistive organic liquid are those disclosed in U.S. Pat. No. 4,772,103, and details concerning the liquid suspending material may be found in U.S. Pat. No. 4,407,565.

Other types of suspensions which do not incorporate such halogenated liquids can also be used and can maintain the particles in gravitational equilibrium if a sufficient quantity of stabilizing polymer is employed therein.

Another useful light valve suspension is based on the use as the liquid suspending medium of non-volatile or minimally volatile organic liquids, commonly classified as plasticizers. Such "plasticizer" liquid suspending media may comprise one or more electrically resistive, chemically inert, relatively non-volatile (high boiling) organic liquids that will suspend the particles and will dissolve the polymeric stabilizer but not the matrix polymer. For example, where the polymeric stabilizer includes a solid poly(meth)acrylate, useful liquid suspending media include liquid plasticizers for poly(meth)acrylates, such as adipates, benzoates, glycerol triacetate, isophthalates, mellitates, oleates, chloroparaffins, phthalates, sebacates and the like. Liquid suspending media for other solid polymeric stabilizers may be similarly selected form liquids useful as plasticizers for such polymers. Preferably, trialkyltrimellitates, such as tri-n-propyl- or tri-n-butyl-trimellitate and/or dialkyl adipates, such as di-2-ethylhexyl adipate, may be used as the liquid suspending medium for solid polymeric stabilizers based on copolymers of neopentyl(meth)acrylate.

The polymeric stabilizer, when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose, which, in effect, provides a plain surface coating for the particles and one or more additional types of solid polymeric stabilizer that bond to or associate with the first type of solid polymeric stabilizer and also dissolve in the liquid suspending medium to provide dispersion and steric protection for the particles.

Preferably, to keep the particles in suspension, the liquid suspending medium may also comprise as the solid polymeric stabilizer an A—B type block polymer as disclosed in U.S. Pat. No. 5,279,773, which is incorporated herein by reference thereto, and in European Patent Publication 350, 354. Nitrocellulose and/or other solid polymeric stabilizers may also be usefully provided in the liquid suspending medium in addition to the block polymer. It is preferred to use just enough A—B block polymer to maintain the particles in suspension, the amount to be used for a given light valve suspension being empirically determined, as is known. Usually, the amount of the solid polymeric stabilizer will be from about 1% to about 30%, such as from 5% to about 25%, by weight, based on the total weight of the liquid light valve suspension. However, while the use of a solid polymeric stabilizer is preferred, it need not be used in all cases. Indeed, liquid polymeric stabilizers may be used to advantage, as described in detail hereinafter.

Liquid Polymeric Stabilizers

The polymeric stabilizers previously proposed for use in a liquid light valve suspension have generally been glassy solids. A concentrate of a liquid light valve suspension made using a glassy solid polymer as the polymeric stabilizer must also use a liquid suspending medium that includes a solvent, as described above, to enable the concentrate to be processed into a usable film, but the solvent imposes limitations on the amount of particles that can be included in the concentrate. However, where the polymeric stabilizer is a liquid polymer, the liquid polymeric stabilizer can provide part, or preferably all, of the liquid suspending medium and thus the concentrate can contain a much larger percentage of particles, which in turn enables the production of a thinner, darker film than otherwise.

Also where the matrix polymer and the polymeric stabilizer have both been modified by the substitution of phenyl and fluorine, respectively, it would be very difficult to find a solvent that would dissolve one without dissolving the other. An additional problem encountered with the use of a solvent for a solid polymeric stabilizer is that the refractive index of the solvent can be very much higher than that of the matrix polymer and solid polymeric stabilizer, which increases the amount of haze in the film. These problems are avoided by the use of a liquid polymeric stabilizer, such as those described in U.S. application Ser. No. 07/972,830 (WO94/11772).

The liquid polymeric stabilizer is prepared in a conventional manner by using a monomer or monomers that will provide the polymeric stabilizer with a sufficiently low glass transition temperature so that the polymeric stabilizer is liquid at room temperature (about 20° C.). For example, the proper selection of pendant alkyl groups, with respect to the number of carbon atoms as well as the presence or absence of branching as is shown in the art, enables the production of a polymer with a predetermined glass transition temperature (which may be as low as −70° C.). The molecular weight of the polymer will determine the viscosity of the polymeric stabilizer, the higher the molecular weight, the higher the viscosity, as is known. A suitable range of molecular weight for the liquid polymeric stabilizer is from about Mw 1000 to about Mw 2 million.

The monomers for the liquid polymeric stabilizer will be selected as described above for the solid polymeric stabilizer so that the resulting liquid polymeric stabilizer will not dissolve the matrix polymer, but will bond to the surface of the particles and be miscible with any other liquids comprising the liquid suspending medium. Where the particles are coated with nitrocellulose, the liquid polymeric stabilizer preferably includes a small percentage of functional groups that enable the polymeric stabilizer to associate with nitrocellulose, such as groups derived from an unsaturated organic acid, ester or anhydride thereof, such as maleic acid anhydride, or other suitable functional groups such as methylol acrylamide, 2-hydroxyethyl(meth)acrylate, etc. Useful liquid polymeric stabilizers include polymerized units of alkyl(meth)acrylates, such as n-butyl acrylate, and/ or fluorinated alkyl(meth)acrylates, such as heptafluorobutylacrylate and the like, usually with a small percentage of an unsaturated acid, ester or anhydride thereof, methylol acrylamide, 2-hydroxyethyl(meth)acrylate or the like. In the Examples that follow, the proportions of the monomers are given in weight percentages of the monomers charged. In some cases, the percentages differ slightly from 100%.

Since the molecular weight of a liquid polymeric stabilizer can be controlled, its viscosity can be adjusted to produce a light valve suspension which consists only of a lower viscosity liquid polymeric stabilizer and particles. Separate liquid suspending medium and polymeric stabilizer are not needed. This light valve suspension can then be encapsulated in a matrix polymer whose index of refraction is matched to that of the liquid polymeric stabilizer to form a low haze film that does not need to be swelled. This is ideal for those cases where it is desirable to produce the film between conductive coated substrates of rigid or flexible glass or plastic without further processing (a sandwich cell). This would be particularly useful in those cases where a fast decay time is not required, for instance in architectural glazing.

Preparation Of The Film-Forming Emulsion

The liquid cross-linkable oligomer or polymer and the light valve suspension are chosen so that the components of one are compatible with the other. That is, neither will deleteriously affect the other. Moreover, the cross-linking agent used to form the cross-linked polymer matrix, the by-products of the cross-linking reaction, if any, and the cross-linking conditions, e.g. temperature, pressure etc., must also be compatible with and not adversely affect the cross-linkable oligomer or polymer, the cross-linked polymer matrix and/or the light valve suspension. For example, if the particles are heat-sensitive, the cross-linking reaction must take place at a temperature at which the particles are stable. If the particles are adversely affected by water, the by-products of the cross-linking reaction must be non-aqueous.

Useful liquid cross-linkable oligomers and polymers include liquid cross-linkable polyorganosiloxanes, polybutadienes, polyolefins, silicone gums, polyacrylamides and the like. The liquid cross-linkable oligomer or polymer may inherently have functional groups that enable it to be cross-linked, such as a polyacrylamide, or it may be a polymer that has been modified to include such functional groups, such as dihydroxy terminated polydimethylsiloxane. Crosslinkable functional groups are known in the art and include hydroxy, carboxy, amine, amide, silane, and the like. The oligomer or polymer to be cross-linked may have two or more cross-linkable functional groups per molecule, and may even comprise a large number of such groups provided that the solubility requirements previously stated herein are met. Such cross-linkable functional groups may be located not only at or near the ends of the oligomer or polymer chain but also along the chain and may be substituted either directly to the chain or on groups pendant from the oligomer or polymer chain.

Appropriate cross-linking agents are those that will react with the cross-linkable functional groups, as is known, such as alkoxy silanes, alkyl orthotitanates and the like. One or both of the cross-linkable oligomer or polymer and the cross-linking agent must have a cross-linking functionality greater than two, as is known. The cross-linking reaction may also be a condensation between polyfunctional monomers that gives rise to a cross-linked polymer.

It is presently preferred to use a cross-linkable polyorganosiloxane as the cross-linkable oligomer or polymer. Cross-linkable polyorganosiloxanes useful in the present invention are known or can be prepared by methods known in the art. Such liquid cross-linkable polyorganosiloxanes comprise repetitive units of silicon atoms linked to oxygen atoms, where the silicon atoms are substituted by one or usually two substituted or unsubstituted organic groups, and, of course, they also comprise cross-linkable functional groups. Useful organic groups include aliphatic, cycloaliphatic, aromatic, heterocyclic, aliphatic aromatic, aromatic aliphatic and the like. The organic group is preferably saturated aliphatic or aromatic. Most preferably, the organic group is alkyl, aryl, aralkyl or alkaryl.

The cross-linkable polyorganosiloxane oligomer or polymer may be a homopolymer, such as

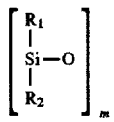

where $R_1$ and $R_2$ are the same or different organic groups, or a copolymer, such as a copolymer of the units

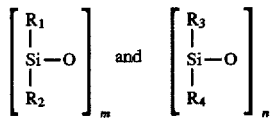

wherein at least one of $R_1-R_4$ is a different organic group than the others. For examples $R_1$, $R_2$ and $R_3$ may be alkyl, preferably methyl, whereas $R_4$ is aryl or aralkyl, preferably phenyl.

Cross-linkable polyorganosiloxane oligomers or polymers are preferred for use in the present invention to provide the cross-linked polymer matrix for many reasons. The cross-linked polyorganosiloxanes have excellent oxidation and UV stability and are stable over a wide temperature range. Indeed, when some of the organic groups are aryl, such as phenyl, the temperature stability is increased. Because of the wide availability of polyorganosiloxanes and the ease with which they may be cross-linked, these polymers are relatively inexpensive to make and use.

Moreover, a cross-linked polyorganosiloxane polymer matrix is compatible with a broad range of particles, liquids and polymeric stabilizers used in light valve suspensions. Equally important, the cross-linked polyorganosiloxane polymer matrix provides the film with a high dielectric strength, which allows for the use of large voltages across the light valve cell without arcing.

It is presently preferred to use a liquid cross-linkable polydimethyl siloxane oligomer or polymer and a multifunctional alkoxy silane cross-linking agent, primarily for reasons of convenience and economics.

The cross-linked polyorganosiloxane polymer is conveniently prepared by the cross-linking reaction between a high weight average molecular weight (about Mw 110,000—about 150,000) liquid dihydroxy-terminated linear polydimethylsiloxane and a tri-or tetra- alkoxy silane. If the organosiloxane copolymer emulsifier described hereinafter is used, lower weight average molecular weight polyorganosiloxane oligomers or polymers can be used, such as from about Mw 13,000 or more. The cross-linking reaction may be catalyzed by metal salts of organic acids (e.g. tin octoate, ferric octoate, dibutyl tin dilaurate, etc.) at room temperature. The amount and type of catalyst and/or cross-linking agent can be varied to change both the rate of cross-linking of the polymer matrix and the properties of the resulting cross-linked polymer matrix.

The film of the invention may be prepared by mixing together a liquid cross-linkable oligomer or polymer, cross-linking agent, catalyst and emulsifier, if any, and liquid light valve suspension, to form a multitude of droplets of light valve suspension in the liquid cross-linkable polymer. The emulsion is then cast as a film and allowed to cure as described above, thus yielding a film containing encapsulated droplets of the liquid light valve suspension. Alternatively, a semi-solid emulsion comprising the cross-linkable polymer or oligomer and the cross-linking agent and catalyst can be mixed with the liquid light valve suspension and then cast as a film and cured as described above.

Copolymer Emulsifier Used To Make The Film

While it is possible to form an emulsion of the cross-linkable oligomer or polymer and the light valve suspension by mechanical means, it is preferable to use an emulsifier to obtain a more stable emulsion. When the liquid cross-linkable oligomer or polymer is a cross-linkable polyorganosiloxane, the emulsifier is preferably a copolymer of an organosiloxane and a copolymerizable organic monomer, such as described in U.S. application Ser. No. 07/972,830 (WO94/11772). The polyorganosiloxane moiety will be soluble in the liquid cross-linkable polyorganosiloxane oligomer or polymer used to form the polymer matrix, while the polymerized organic monomer will be soluble in the liquid light valve suspension. Most preferably, the copolymer of the organosiloxane/organic monomer is an AB block copolymer, although ABA block copolymers can also be used. Random copolymers or A—B—A—B copolymers are not likely to be as effective. It is presently preferred to provide the organosiloxane/organic monomer copolymer with a weight average molecular weight of from about 20,000 to about 2,000,000, most preferably from about 30,000 to about 80,000.

The use of the copolymer emulsifier with the cross-linkable polyorganosiloxane oligomer or polymer provides several advantages over emulsification by mechanical means. Thus, the copolymer emulsifier provides an emulsion of improved stability using a lower Mw cross-linkable polyorganosiloxane oligomer or polymer, which leads to improved films and easier processing. Moreover, the copolymer emulsifier ensures that each droplet of light valve suspension will be surrounded by the polyorganosiloxane polymer matrix, thus avoiding bleeding of light valve suspension from imperfectly enclosed droplets. The copolymer emulsifier also prevents coalescence of the droplets, which enables the production of smaller capsules and a smaller size distribution of the capsules. In addition, a higher ratio of liquid light valve suspension to polyorganosiloxane matrix polymer can be obtained without phase reversal (i.e. capsules of polyorganosiloxane in a suspension matrix), which enables the production of a darker, more homogeneous film.

Organosiloxane polymers useful as the copolymer emulsifier are known or can be prepared by methods known in the art. Typical block copolymers include copolymers of organosiloxanes and polyacrylates, polymethacrylates, polyethers, polymethylstyrenes, alkyd resins, polyamides, polyurethanes, polycarbonates, epoxy resins and the like. Typical methods of preparation include copolymerizing a polyorganosiloxane terminated at one or both ends with a polymerizable vinyl group with a copolymerizable organic monomer or condensing a polyorganosiloxane prepolymer having a reactive group with an organic polymer having a complementary reactive group and the like. To facilitate the production of the block copolymer, the copolymerizable polyorganosiloxane prepolymer can be treated with an initiator before reaction with the comonomer or group transfer techniques or other suitable copolymerization methods can be used.

It is presently preferred to form the copolymer emulsifier from methacryloxypropyl- or acryloxypropyl terminated polydimethylsiloxane prepolymers, because of their ease of manufacture and/or their commercial availability. Presently, it is preferred to use an acrylate or methacrylate as the comonomer, but other organic comonomers could be used, such as fumarates, maleates, and the like. In general, the polymerized organic comonomer moiety will be selected to be compatible with and soluble in the liquid light valve suspension.

Manufacture of The Film Using The Cross-Linkable Copolymer Emulsifier

According to the present invention, a film useful as the light-modulating agent of a light valve may be prepared by forming an emulsion of the liquid light valve suspension in a liquid cross-linkable copolymer emulsifier. The cross-linkable copolymer emulsifier serves the dual function of providing the cross-linked matrix polymer and an emulsifier. The cross-linkable copolymer has a main chain that includes and is preferably terminated by cross-linkable groups at each end, the main chain being insoluble in the liquid light valve suspension. The cross-linkable copolymer emulsifier also has pendant polymeric groups depending from the main chain, the polymeric groups being soluble in the liquid light valve suspension. Any cross-linking agent that is required to form the polymer matrix is included in the emulsion. The liquid emulsion is then cast on a substrate and allowed to cure while uncovered as described above.

The liquid cross-linkable copolymer emulsifier and the liquid light valve suspension are chosen so that the components of one will not deleteriously affect the other. Moreover, the cross-linking agent used to form the cross-linked polymer matrix, the by-products of the cross-linking reaction, if any, and the cross-linking conditions, e.g., temperature, pressure, etc., must also be compatible with and not adversely affect the cross-linkable copolymer emulsifier, the cross-linked polymer matrix and/or the light valve suspension. For example, if the particles are heat-sensitive, the cross-linking reaction must take place at a temperature at which the particles are stable. If the particles are adversely affected by water, the by-products of the cross-linking reaction must be non-aqueous.

The main chain of the liquid cross-linkable copolymer emulsifier may be a polyorganosiloxane, polybutadiene, polystyrene, poly(cyclopropene), polyamide, polyolefin, silicone gum, polyacrylamide, polyurethane, and the like. The liquid cross-linkable copolymer emulsifier may inherently have functional groups that enable it to be cross-linked, such as a polyacrylamide, or it may comprise a polymeric chain that has been modified to include such functional groups, such as a dihydroxy terminated polydimethylsiloxane. Crosslinkable functional groups are known in the art and include hydroxy, carboxy, amine, amide, silane, and the like. The cross-linkable copolymer emulsifier may have two or more cross-linkable functional groups per molecule, and may even comprise a large number of such groups provided that the solubility requirements previously stated herein are met. Such cross-linkable functional groups may be located not only at or near the ends of the main chain but also along the main chain and may be substituted either directly to the main chain or on groups pendant from the main chain.

Appropriate cross-linking agents are those that will react with the cross-linkable functional groups, as is known, such as alkoxy silanes, alkyl orthotitanates and the like. One or both of the cross-linkable copolymer emulsifier and the cross-linking agent must have a cross-linking functionality greater than two, as is known. The cross-linking reaction may also be a condensation between polyfunctional monomers that gives rise to a cross-linked polymer.

The liquid cross-linkable copolymer emulsifier may be prepared by conventional copolymerization techniques. For example, a prepolymer with functional groups, Y, such as

$$Y-[A]_m-Y \qquad (I),$$

may be linked with a second prepolymer (II) having functional groups, X, such as

$$X-L-X, \qquad (II)$$
$$\quad | $$
$$\quad [B]_n$$

to form a liquid cross-linkable copolymer emulsifier (III) having a main chain terminated by cross-linkable groups and having pendant polymeric groups, such as

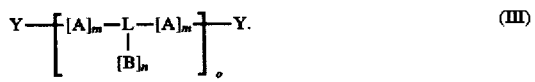

$$Y-\left[[A]_m-L-[A]_m\right]_o-Y. \qquad (III)$$
$$\qquad\qquad | $$
$$\qquad\qquad [B]_n$$

In the above illustration, m, n, and o are integers, A and B are residues of polymers that are, respectively, insoluble and soluble in the liquid light valve suspension, and L is a linking group.

Alternatively, the prepolymer, Y—[A]$_m$Y, may be reacted with a cross-linking agent (IV)

$$L-CH=CH_2 \qquad (IV),$$

to form prepolymer (V) having pendant groups terminated with a vinyl groups, such as

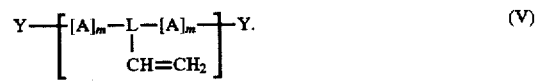

$$Y-\left[[A]_m-L-[A]_m\right]-Y. \qquad (V)$$
$$\qquad\qquad | $$
$$\qquad\qquad CH=CH_2$$

Prepolymer (V) can then be copolymerized with a vinyl monomer to provide the pendant polymeric emulsifier groups of the copolymer emulsifier (III).

Where the cross-linking agent is trifunctional, it is possible for the main chain to have pendant polymeric emulsifier groups and pendant functional groups, X. In such cases, the trifunctional cross-linking agent can link together two polymeric main chains, such as

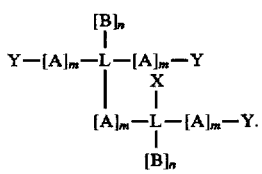

It is presently preferred to use a polyorganosiloxane as the main chain of the cross-linkable copolymer emulsifier. Polyorganosiloxanes comprise repetitive units of silicon atoms linked to oxygen atoms, where the silicon atoms are substituted by one or usually two substituted or unsubstituted organic groups, and, of course, they also comprise cross-linkable functional groups. Useful organic groups include aliphatic, cycloaliphatic, aromatic, heterocyclic, aliphatic aromatic, aromatic aliphatic and the like. The organic group is preferably saturated aliphatic or aromatic. Most preferably, the organic group is alkyl, aryl, aralkyl or alkaryl.

The polyorganosiloxane main chain may be a homopolymer, such as homopolymer of the unit

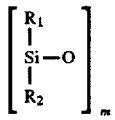

where $R_1$ and $R_2$ are the same or different organic groups, or a copolymer, such as a copolymer of the units

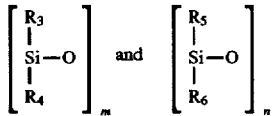

wherein at least one of $R_3$–$R_6$ is a different organic group than the others, and m and n are integers. For example $R_3$, $R_4$ and $R_5$ may be alkyl, preferably methyl, whereas $R_6$ may be aryl or aralkyl, preferably phenyl.

The polyorganosiloxane main chain may also be a silarylene-siloxane copolymer, such as a copolymer of the units:

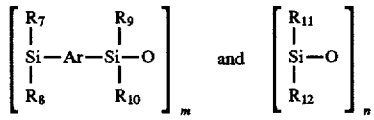

where $R_7$–$R_{12}$ are the same or different organic groups and Ar is arylene. For example, $R_7$–$R_{12}$ may be alkyl, such as methyl, and Ar may be phenylene, naphthylene, xylylene and the like, preferably p-phenylene.

A cross-linked polymer matrix derived from a polyorganosiloxane is preferred for use in the present invention for many reasons. The cross-linked polyorganosiloxanes have excellent oxidation stability and are stable over a wide temperature range. Indeed, when the polyorganosiloxane includes some aromatic groups, such as when some of the silicon atoms in the main chain are substituted by aryl (e.g., R6 is phenyl) or are linked together by arylene (e.g., when Ar is phenylene), the temperature stability is increased. Because of the wide availability of polyorganosiloxanes and the ease with which they may be cross-linked, these polymers are relatively inexpensive to make and use.

Moreover, a cross-linked polyorganosiloxane polymer matrix is compatible with a broad range of particles, liquids and polymeric stabilizers used in light valve suspensions. Equally important, the cross-linked polyorganosiloxane polymer matrix provides the film with a high dielectric strength, which allows for the use of large voltages across the light valve cell without arcing.

When the main chain of the cross-linkable copolymer emulsifier is a polyorganosiloxane, it is preferred that the pendant groups are provided by polyacrylates, polymethacrylates, polyethers, polymethylstyrenes, alkyd resins, polyamides, polyurethanes, polycarbonates, epoxy resins and the like. In a presently preferred embodiment of the invention, the pendant groups are acrylates or methacrylates.

A suitable process for preparing liquid cross-linkable copolymer emulsifiers having a polyorganosiloxane main chain and pendant (meth)acrylate groups is to copolymerize a polyorganosiloxane having terminal hydroxy groups with a (meth)acryloxypropyl-dialkoxyalkylsilane, -trialkoxysilane, -diaryloxyalkylsilane, or -triaryloxysilane, and a (meth)acrylate monomer. For example, when a (meth)acryloxypropyl-dimethoxymethylsilane or -trimethoxysilane is used, the resulting cross-linkable

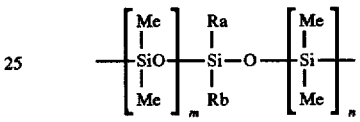

where Ra is methyl or methoxy (depending on whether a -dimethoxymethylsilane or -trimethoxysilane was used) and Rb is a poly(meth)acrylate linked to the silicon atom via a propylene group. If Ra is methoxy, then another polyorganosiloxane main chain may be linked to the depicted silicon atom by reaction of the methoxy group with a terminal hydroxy group of the dihydroxy-terminated polyorganosiloxane. Suitable catalysts are preferably employed.

Alternatively, a (meth)acrylate prepolymer can be prepared by copolymerizing a (meth)acrylate with the (meth)acryloxypropyl-dialkoxyalkylsilane, -trialkoxysilane, -diaryloxyalkylsilane, -triaryloxysilane, etc., and then condensing the (meth)acrylate prepolymer with a dihydroxy-terminated polyorganosiloxane.

Suitably, the polyorganosiloxane moiety of the liquid cross-linkable copolymer emulsifier may have a molecular weight of from about Mw 10,000 to about Mw 3 million, preferably from about Mw 30,000 to about Mw 450,000. Moreover, it is at present contemplated that the polyorganosiloxane main chain will constitute more than about 50%, preferably more than about 90% by weight of the cross-linkable copolymer emulsifier.

While it is presently preferred to use pendant poly(meth)acrylate groups, polymers of other unsaturated acids or esters, such as fumarates, maleates and the like can also be used.

It is presently preferred to cross-link the polyorganosiloxane copolymer emulsifier with a multifunctional alkoxy silane cross-linking agent, primarily for reasons of convenience and economics.

The cross-linking reaction may be catalyzed by metal salts of organic acids (e.g. tin octoate, ferric octoate, dibutyl tin dilaurate, etc.) at room temperature. The amount and type of catalyst and/or cross-linking agent can be varied to change both the rate of cross-linking of the polymer matrix and the properties of the resulting cross-linked polymer matrix.

The use of the liquid cross-linkable copolymer emulsifier has several advantages. Thus, the cross-linkable copolymer emulsifier does not require the use of a separate emulsifier. The cross-linkable copolymer emulsifier also ensures that each droplet of light valve suspension will be surrounded by the polyorganosiloxane polymer matrix, thus avoiding bleeding of light valve suspension from imperfectly enclosed droplets. The cross-linkable copolymer emulsifier also prevents coalescence of the droplets, which enables the production of smaller capsules and a smaller size distribution of the capsules. In addition, a higher ratio of liquid light valve suspension to polyorganosiloxane matrix polymer can be obtained without phase reversal (i.e., capsules of polyorganosiloxane in a suspension matrix), which enables the production of darker, thinner and more homogeneous films.

Reduction Of Haze In The Film

Light valves of the prior art described in many of the above-mentioned patents, e.g., U.S. Pat. No. 4,407,565, which use light-absorbing particles, exhibit excellent optical clarity and scatter very little light even though the index of refraction $n_D$ of the liquid suspending medium of their liquid light valve suspensions is far less than the index of refraction of the electrode material. For example, the index of refraction of one commonly used electrode material, indium tin oxide, is about 2.0 (although it can be somewhat higher or lower depending on layer thickness) whereas the index of refraction, $n_D$, for the liquid suspending medium will fall in the range of 1.33–1.68 and is usually in the range of about 1.38–1.56. Likewise $n_D$ for the liquid suspending medium can be substantially lower or higher than that of the glass sheets usually used as the walls of the light valve. The refractive index of glass varies according to the composition of the glass but is commonly about 1.52.

Although some light is lost in a light valve by absorption in or by reflection from the electrodes and walls, no objectionable light scatter is normally caused by them despite the fact that their refractive indices usually differ substantially from that of the liquid suspending medium. Hence, the refractive indices of the walls and electrodes of the light valve can be ignored.

It has been found that the haziness or light scatter of a film comprising a cross-linked matrix polymer having a liquid light valve suspension incorporated therein can be reduced by modifying the matrix polymer and/or the liquid portion of the liquid light valve suspension which contains or is a polymeric stabilizer so that their indices of refraction are more closely matched.

In the preferred system employing a polyorganosiloxane as the cross-linked matrix polymer, this can be accomplished by using a liquid fluorinated polymeric stabilizer in the liquid light valve suspension to lower the index of refraction of the polymeric stabilizer. Further improvement is possible if the polyorganosiloxane contains aromatic groups to raise the index of refraction of the matrix polymer.

In particular, where the polyorganosiloxane matrix polymer is a polyalkylsiloxane, such as a polydimethylsiloxane, a reduction in the haze of the film can be obtained by using as the polymeric stabilizer a poly(meth)acrylate containing fluorine atoms. Further reduction in the haze can be obtained by introducing aromatic groups into the polyalkylsiloxane. This can be accomplished by providing a copolymer of an alkylsiloxane and an arylsiloxane or through the use of a silarylenesiloxane copolymer, as described above.

If the amount of aromatic groups introduced into the polyorganosiloxane matrix polymer is too large, the polymeric stabilizer in the liquid light valve suspension may become soluble in the liquid polyorganosiloxane matrix polymer, which will prevent the particles from orienting in the presence of an electrical field. If the fluorine content in the polymeric stabilizer is too large, it will become incompatible with any nitrocellulose used in the liquid light valve suspension. It has now been found that the optimum solution is to introduce a controlled amount of aromatic groups into the organosiloxane moiety of the cross-linkable copolymer emulsifier and to introduce fluorine atoms into the emulsifier moiety thereof, while also providing fluorine substitution in the liquid polymeric stabilizer.

The use of a silarylene-siloxane copolymer to provide a polyorganosiloxane main chain in which an arylene, e.g., phenylene, group links together two silicon atoms in the main chain of the polymer has several benefits, the most important of which is that the tendency of the polymer to depolymerize, via a ring-chain equilibrium reaction, is reduced. However, from the standpoint of determining the refractive index of the matrix polymer, the same improvement in reducing haze can be obtained with the same mole percent of phenyl or phenylene groups if the molecular weights are essentially the same, even though in one matrix polymer the phenyl groups are linked to a silicon atom whereas in another matrix polymer the phenylene groups are linked to two silicon atoms.

This concept of haze reduction is also applicable to films in which a liquid cross-linkable polyorganosiloxane that does not have emulsifier groups is used to form the matrix polymer. In such cases, the cross-linkable polyorganosiloxane may be modified to include aromatic groups while the liquid polymeric stabilizer is modified to include fluorine. Preferably, this system also includes a copolymer of an organosiloxane and a copolymerizable organic monomer as a (non-cross-linkable) copolymer emulsifier. When such a non-cross-linkable copolymer emulsifier is employed, a limited amount of aromatic groups will be introduced into the organosiloxane moiety of the copolymer emulsifier and into the cross-linkable polyorganosiloxane oligomer or polymer, While fluorine substitution will be provided in the organic polymer moiety of the copolymer emulsifier and into the liquid polymeric stabilizer.

The levels of substitution will necessarily be empirically determined to reduce the haziness of the film without encountering adverse effects. Moreover, a relatively larger amount of aromatic groups in the organosiloxane moiety of the matrix polymer and copolymer emulsifier can be offset by the use of a relatively small amount of fluorinated monomer in the polymeric stabilizer, and vice versa.

Other Additives

The liquid light valve suspension and/or the film or light valve of the present invention may optionally also have therein other compatible materials, such as heat stabilizers and non-polymeric surfactants and dispersants, etc.

Detailed Description Of The Invention

Figure 1B:
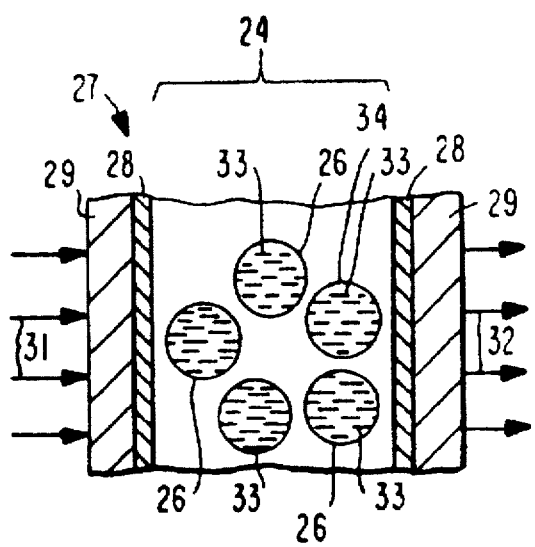

Referring to FIG. 1A, a beam of light 31 impinges on an SPD light valve 27 of the present invention. SPD light valve 27 comprises an SPD film 24 containing droplets of a liquid light valve suspension 26, with electrodes 28 in contact with SPD film 24. Protective layers 29 are in contact with each electrode 28. It is assumed that no potential difference, i.e., electric field, exists between the electrodes 28. Hence the particles 33 dispersed within the microdroplets 26 of the liquid light valve suspension are in random positions due to Brownian Movement. Because the particles absorb light, a beam of light 31 impinging on the SPD film is absorbed by particles 33 within the microdroplets 26. FIG. 1B assumes that an electric field (not shown) exists between the electrodes 28. As a result, the particles 33 align within the microdroplets 26 and a considerable portion of the beam of light 31 passes through the film as indicated by the arrows 32.

Electrodes for use in light valves and methods of depositing electrodes on glass and plastic substrates are well known in the art. For example, see U.S. Pat. Nos. 3,512,876 and 3,708,219 which disclose use of electrodes in light valves, and see U.S. Pat. Nos. 2,628,927, 2,740,732, 3,001,901 and 3,020,376 which disclose articles having conductive and especially conductive transparent coatings on glass and plastic substrates and methods of forming or depositing such coatings. Indium tin oxide ("ITO") or other conductive metal can be used.

It is presently preferred that the electrode 28 and protective layer 29 be in the form of a prefabricated assembly. Thus, the electrode 28 and protective layer 29 can be provided by a film 29, such as a plastic film, that has been coated with an electrode 28 before application of the assembly to the film 24. As used herein the term "electrode" shall be understood to mean not only electrically conductive metal oxide and other coatings used in the art for such purpose but also such coatings which have dielectric overcoatings on them of materials such as silicon monoxide or dioxide, titanium dioxide, aluminum oxide, tantalum pentoxide, magnesium fluoride, etc. The electrodes may cover all or part of the substrate on which they are located and may also be applied in patterns. For example, in a light valve functioning as a variable light transmission window or filter for which one would usually wish to vary the amount of light passing through the entire active area of the device. On the other hand, if the light valve were intended to be used as a display device the electrodes would normally be deposited in patterns in discrete areas of the substrate. The term "electrode" as used herein also comprises use of semiconductor films and plural film layers, both transparent and colored, such as are used in active matrix addressed display devices. In all cases where the film of the present invention is used in a light valve device it is assumed that there are appropriate electrical connections leading to a power supply suitable to operate the device.

Although the usual type of liquid light valve suspension used in a light valve increases in light transmission when voltage is applied, it should be understood that the present invention also comprises light valves, films and liquid light valve suspensions which decrease in light transmission when a voltage is applied, as is disclosed in U.S. Pat. No. 4,078,856, or which when activated increase the transmission of radiation in one part of the electromagnetic spectrum and decrease transmission in another part of the spectrum as is disclosed in U.S. Pat. No. 3,743,382.

The film of the present invention can itself function as a light valve provided that it has electrodes on its surfaces or protective layers. However, if the film itself is to function as a light valve, electrodes should preferably be on the inside surface of each protective layer facing the interior part of the film to avoid being scratched and to minimize voltage required to activate the film. Also the external surfaces of the protective plastic layers may have thereon an ultraviolet absorbing lacquer filter such as the type sold by E. M. Chemicals of Hawthorne, N.Y. Numerous other clear surface coatings are commercially available to reduce abrasion and environmental attack especially on plastics. One such system is produced by The Silicone Products Division of General Electric Co., Waterford, N.Y., comprising a hard coating primer called SHP 200 plus SHC 1200 Silicone Hard Coating Resin. A radiation—curable clear coating that resists abrasion and ultraviolet degradation is sold by The Sherwin Williams Company of Chicago, Ill. under the name Permaclear UV.

The same types of surface coatings may be useful with other embodiments of the present invention, particularly where the film is sandwiched between hard plastic substrates such as polycarbonate.

The present invention is illustrated by the following Examples. All parts and percentages are by weight, unless otherwise noted.

EXAMPLE 1(a)—(COMPARATIVE)

A dihydroxy-terminated silphenylene-siloxane copolymer emulsifier containing about 9.5 weight percent of phenyl groups and a weight average molecular weight of about 24,000 was prepared by generally following the procedure of Example 24 of U.S. application Ser. No. 07/972,830 (Example 24 of WO94/11772). This copolymerizable emulsifier was designated as "Copolymer A".

SPD Light Valve A was prepared by combining 2.0 g of Copolymer A, 1.5 g of a liquid random copolymer of n-butyl acrylate, heptafluoroacrylate and hydroxyethylacrylate (64%, 34%, 2%) having a weight average molecular weight of about 94,600 as a liquid suspending polymer ("SPA"), 0.13 g of a concentrate consisting of 25% by weight of crystals of pyrazine-2,5-dicarboxylic acid calcium polyiodide and 75% by weight of the liquid suspending polymer SPA, 0.11 g of dibutyltin dilaurate as catalyst and 0.11 g of tetra-n-butyl orthosilicate (tetra-n-butoxysilame) as cross-linking agent.

After the ingredients were combined, the mixture was stirred throughly with a high speed homogenizer (Omni 2000, manufactured by Omni international, Waterbury, CT, USA). The resulting liquid emulsion ("Emulsion A") was then coated, using a drawbar, onto two transparent conductive oxide coated glass substrates at a thickness of 2 mils each (about 50 microns), and the coated substrates were joined together under vacuum to form a film therebetween of four mils thickness. After being returned to ambient pressure, the film was cured at 85° C. for at least one hour. After cooling, the SPD Light Valve A thus formed was ready for UV testing.

EXAMPLE 1(b)

SPD Light Valve B according to the invention was prepared by forming an emulsion using the same ingredients and procedure used to form Emulsion A of Example 1(a), except that 0.20 of the concentrate and 0.10 g of the cross-linking agent were used.

The resulting emulsion was then coated, using a drawbar, onto a transparent conductive oxide coated glass substrate, at a thickness of 2 mils and was allowed to cure for four days under ambient conditions (about 21° C.) in a laminar flow (clean air) hood. After the film had cured, a second transparent coated oxide coated glass substrate was mated to the exposed film surface to form SPD Light Valve B.

EXAMPLE 2

SPD light valves A and B, prepared according to Example 1, were exposed to ultraviolet radiation having a wavelength of 270–400 nm for 284.4 and 262.15 hours, respectively. This accelerated aging test simulates the effect of exposure to sunlight for a long period of time. The transmission of light through each SPD light valve in the OFF state was measured at wavelengths from 380 to 720 nanometers, in 10 nanometer intervals, before and after exposure to ultraviolet radiation, and the percentage increase in light transmission in the OFF after exposure to the ultraviolet radiation was calculated. The data are plotted in FIG. 2.

As can be seen, the percentage increase in light transmission for SPD light valve B, prepared according to the invention, after prolonged exposure to ultraviolet radiation, ranged from zero to about 12%, but was no more than about 5% for essentially all of the wavelengths measured. In contrast, SPD light valve A showed an increase in light transmission of about 40 to about 80% after prolonged exposure to ultraviolet radiation, indicating that the particles in the liquid light valve suspension were degraded by the UV radiation.

EXAMPLE 3

Example 1(b) was repeated except that the uncovered liquid layer of the film-forming emulsion was cured at room temperature (about 21° C.) for three days in a laminar flow hood. The SPD light valve prepared by laminating an electrode-carrying substrate to the cured (and unswollen) SPD light valve film had about the same light transmission in the OFF and ON states as SPD light valve B before exposure to ultraviolet radiation, and will have at least the same UV stability as SPD light valve B because any deleterious materials would have been volatilized during curing.

EXAMPLE 4

Example 1(b) was repeated except that the uncovered liquid layer of the film-forming emulsion was cured under vacuum at room temperature (about 21° C.) for three days. The SPD light valve prepared by laminating an electrode-carrying substrate to the thus cured (and unswollen) SPD light valve film had about the same light transmission in the OFF and ON states as SPD light valve B before exposure to ultraviolet radiation, and will have at least the same UV stability as SPD light valve B, because any deleterious materials would have been volatilized during curing.

EXAMPLE 5

Example 1(b) was repeated except that the uncovered liquid layer of the film-forming emulsion was cured at 85° C. for three days while exposed to the atmosphere. The SPD light valve prepared by laminating an electrode-carrying substrate to the cured (and unswollen) SPD light valve film had about the same light transmission in the OFF and ON states as SPD light valve B before exposure to ultraviolet radiation, and will have at least the same UV stability as SPD light valve B, because any deleterious materials would have been volatilized during curing. It was noted that this cured SPD light valve film was slightly discolored as compared to the films of Examples 1–4.

I claim:

1. A method of preparing an SPD light valve having opposed cell walls and an SPD light film between said cell walls, the SPD light valve film comprising a cross-linked polymer matrix having droplets of a liquid light valve suspension distributed in the cross-linked polymer matrix, the method comprising:

(a) casting on a first substrate a layer of a film-forming liquid or semi-solid emulsion comprising a cross-linkable polymer, a cross-linking agent, a catalyst and a liquid light valve suspension, said liquid light valve suspension comprising particles suspended in a liquid suspending medium, said layer having a first surface in contact with said first substrate and an uncovered, opposed second surface;

(b) cross-linking and curing said cross-linkable polymer in said layer by reaction with said cross-linking agent in the presence of said catalyst while said second surface of said layer remains uncovered to form a cured SPD light valve film comprising a cross-linked polymer matrix having droplets of the liquid light valve suspension distributed therethrough, said cured SPD film having one surface in contact with said first substrate, and an uncovered, opposed second surface, said cured SPD film being unswollen by any swelling liquid;

(c) covering said uncovered surface of said cured and unswollen SPD light valve film with a second substrate;

(d) laminating said substrates to said SPD light valve film; and (e) providing each of said substrates with an electrode before or after said lamination step.

2. The method according to claim 1, wherein said uncovered emulsion layer is allowed to remain uncovered at room temperature until said cross-linkable polymer is cross-linked and cured.

3. The method according to claim 2, wherein said uncovered emulsion layer is exposed to the atmosphere or is under vacuum or is in a laminar flow hood during said cross-linking and curing step.

4. The method according to claim 1, wherein said uncovered emulsion layer is allowed to remain uncovered at elevated temperature until said cross-linkable polymer is cross-linked and cured.

5. The method according to claim 4, wherein said uncovered emulsion layer is exposed to the atmosphere or is under vacuum or is in a laminar flow hood during said cross-linking and curing step.

6. The method according to claim 1, wherein said cross-linkable polymer is a cross-linkable polyorganosiloxane.

7. The method according to claim 1, wherein said cross-linkable polymer is a cross-linkable polybutadiene, polystyrene, poly(cyclopropene), polyamide, polyolefin, silicone gum, polyacrylamide, polyester, polyether or polyurethane.

8. The method according to claim 1, wherein said cross-linkable polymer has a main chain that is insoluble in said liquid suspending medium and pendant polymeric groups that are soluble in said liquid suspending medium.

9. The method according to claim 8, wherein said main chain comprises a polybutadiene, polystyrene, poly(cyclopropene), polyamide, polyolefin, silicone gum, polyacrylamide, polyester, polyether or polyurethane.

10. The method according to claim 8, wherein said pendant polymeric groups are selected from the group consisting of polyacrylates, polymethacrylates, polyethers, polymethylstyrenes, alkyd resins, polyamides, polyurethanes, polycarbonates and epoxy resins.

11. The method according to claim 8, wherein said main chain comprises a polyorganosiloxane.

12. The method according to claim 11, wherein said pendant polymeric groups are polyacrylates and/or polymethacrylates.

13. The method according to claim 6, wherein said cross-linkable polyorganosiloxane polymer contains aromatic groups.

14. The method according to claim 13, wherein said cross-linkable polyorganosiloxane polymer is a crosslinkable copolymer derived from an alkylsiloxane and a diphenylsiloxane and/or a phenylalkylsiloxane or is a cross-linkable silphenylene-alkylsiloxane cross-linkable copolymer.

15. The method according to claim 1, wherein said liquid light valve suspension comprises particles suspended in a liquid suspending medium comprising in whole or in part a liquid polymeric stabilizer that is effective to prevent agglomeration of said particles.

16. The method according to claim 15, wherein said liquid polymeric stabilizer comprises polymerized units of alkyl (meth)acrylates and/or fluorinated alkyl(meth)acrylates.

17. The method according to claim 16, wherein said liquid polymeric stabilizer comprises polymerized units of an unsaturated acid, ester or anhydride.

18. The method according to claim 17, wherein said liquid polymeric stabilizer comprises a copolymer derived from an alkyl(meth)acrylate, a fluorinated alkyl(meth)acrylate and an unsaturated acid, ester or anhydride thereof.

19. The method according to claim 15, wherein said cross-linkable polymer is a cross-linkable polyorganosiloxane polymer having a main chain comprising a dimethylsiloxane-phenylmethylsiloxane copolymer or a dimethylsiloxane-silphenylene copolymer, said main chain having pendant poly(fluorinated alkyl(meth)acrylate) groups and said liquid polymeric stabilizer comprises a copolymer derived from an alkyl(meth) acrylate, a fluorinated alkyl(meth) acrylate and an unsaturated acid, ester or anhydride thereof.

20. The method to claim 1, wherein said particles are organic, light-polarizing particles.

* * * * *

UNITED STATES PATENT AND TRADEMARK OFFICE
CERTIFICATE OF CORRECTION

PATENT NO. : 5,728,251
DATED : March 17, 1998
INVENTOR(S) : Joseph A. Check III

It is certified that error appears in the above-identified patent and that said Letters Patent is hereby corrected as shown below:

On the title page, at item [73]
the name of the Assignee should
read -- Research Frontiers Incorporated,
Woodbury, New York--.

Signed and Sealed this

Twenty-seventh Day of July, 1999

Attest:

Q. TODD DICKINSON

*Attesting Officer*      *Acting Commissioner of Patents and Trademarks*